United States Patent [19]

Gomez

[11] Patent Number: 5,183,852
[45] Date of Patent: Feb. 2, 1993

[54] POLYBLENDS CONTAINING POLYURETHANE, POLYMER AND SILOXANE CROSSLINKER

[75] Inventor: Peter M. Gomez, Northampton, Mass.

[73] Assignee: Monsanto Company, St. Louis, Mo.

[21] Appl. No.: 703,959

[22] Filed: May 22, 1991

[51] Int. Cl.$^5$ .............................................. C08F 8/32
[52] U.S. Cl. ..................................... 525/101; 525/125
[58] Field of Search ..................... 525/101, 102–103, 525/125

[56] References Cited

U.S. PATENT DOCUMENTS

| | | | |
|---|---|---|---|
| 3,691,257 | 9/1972 | Kendrick et al. | 260/827 |
| 4,320,172 | 3/1987 | Takamizawa et al. | 428/447 |
| 4,968,750 | 11/1990 | Eichenauer et al. | 525/100 |
| 4,980,417 | 12/1990 | Biglione et al. | 525/125 |

FOREIGN PATENT DOCUMENTS 2279729A 11/1990 Japan .

OTHER PUBLICATIONS

Billmeyer, *Textbook of Polymer Science* (1965), p. 438.
Modern Plastics Encyclopedia (1988), pp. 103,106,108.

*Primary Examiner*—Melvyn I. Marquis
*Assistant Examiner*—D. E. Aylward
*Attorney, Agent, or Firm*—William J. Farrington; Richard H. Shear

[57] ABSTRACT

The invention pertains to blends of polymers containing a polyurethane, a polymer having reactive carboxyl moieties and a siloxane crosslinking agent. The polymer is most preferably represented by a terpolymer. The crosslinking agent contains reactive moieties such as hydroxy-, amine-, and epoxy-moieties and has a molecular weight which is preferably in the range of from about 1,500 to 60,000. The crosslinker can be used in relatively low molecular ratios vs. the polymerisable dicarboxylic acid in the polymer. Shaped articles made from the polyblends herein can be processed under high temperature conditions without suffering alterations; the articles so produced show desirable physical properties inclusive of reduced plasticiser migration, reduced fogging and enhanced low-temperature flexibility.

9 Claims, No Drawings

POLYBLENDS CONTAINING POLYURETHANE, POLYMER AND SILOXANE CROSSLINKER

This invention relates to polyblends of polymeric matrix ingredients comprising polyurethanes and polymers having free (reactive) carboxylmoieties and siloxane crosslinking agents. The claimed polyblends exhibit desirable and beneficial properties as regards the processing thereof and the physical and mechanical properties of the articles made therefrom.

Unless stated otherwise, all proportions and percentages hereinafter are by weight.

The prior art can be possessed of the individual components herein and of relevant subcombinations thereof. For example polyurethane polymer blends are known from UK patent application 9006805.7 filed Mar. 27, 1990. Crosslinkers for polymer application are also known and have been recommended for various purposes.

Plasticized polymeric products currently available such as plasticised PVC can be subject to undesirable alteration phenomena such as plasticizer migration, fogging, a decrease in plasticity and brittleness, which render these polymeric products less suitable for broad-scale application. Ternary alloys such as e.g. described in UK application 9006805.7 possess in general good overall properties but present relatively minor weaknesses such as low temperature impact and tension set, the latter ones being comparable to the corresponding parameters for plasticized polymers. There was thus a standing desire to make available polyblends which can be processed easily, and the articles resulting from the processing of said polyblends should desirably possess improved physical properties inclusive of low-temperature flexibility, low-temperature impact, resistance to high-temperature processing, improved tension set and rubber-like final product appearance.

It is a major object of the present invention to make available polyblends which can be processed into shaped articles under high temperature conditions without suffering unacceptable alterations. It is a further object of this invention to make available polyblends which confer to the articles made therefrom desirably physical properties inclusive of reduced plasticizer migration, reduced fogging and enhanced low-temperature flexibility.

The present invention is based, in part, on the discovery that multicomponent polyblends can now be formulated which are easily processable over a broad range of conditions inclusive of high temperature processing. The polyblends herein, which are suitable for use in embossing applications, do have a rubber-like appearance and can be used beneficially for a broad range of commercial applications, inclusive of automotive, cables, pipes and other general applications where optimised impact properties and low temperature flexibility are desirable considering that high temperature processing conditions are required having regard to the composition of the polyblend.

The polyurethane containing polyblends of the invention herein comprise:
a) from 20% to 89% by weight of a polyurethane;
b) from 10% to 70% by weight of a polymer comprising, expressed by reference to the polymer (100%):
  1. from 10% to 95% of a vinylaromatic monomer;
  2. from 1% to 50% of a polymerisable unsaturated dicarboxylic acid; and
  3. from 0% to 50% of another monomer unsaturated carboxylic acid;
  wherein the amounts of components 1, 2 and 3 total 100%
c) from 1% to 25% by weight of a siloxane crosslinker;
d) from 0% to 50% by weight of a further polymeric ingredient;
wherein the amounts of components a, b, c, and d total 100%.

In one preferred embodiment of the invention the polymer can be represented by a terpolymer. The polymer which is preferably used in a level of from 15% to 60% is, in a particularly preferred embodiment, represented by a terpolymer comprising from 20% to 70% of the vinylaromatic monomer, from 15% to 40% of the polymerisable unsaturated dicarboxylic acid and from 5% to 40% of the polymerisable ester of an unsaturated carboxylic acid.

The most preferred crosslinkers are diamine crosslinkers which can be present at a level of from 3% to 15%.

The invention also comprises processes of producing articles by means of conventional techniques inclusive of extrusion (for example a profile or a film), injection-molding or blow-molding thereby utilising the polyurethane based polyblend in accordance with the invention herein.

The polyurethane component can be represented by all known polyurethanes as such or possibly prepared in situ. Suitable polyurethanes can be derived from polyesters and polyethers. In one preferred execution of the invention, the polyurethanes are derived from polyethers.

The polyurethane component is used generally in levels ranging from 20% to 89%. In one preferred aspect of the invention the polyurethane is used in levels of from 28% to 45% in combination with from 53% to 70% of the polymer. The purpose of such combinations aims at selectively increasing strengths and heat resistance as may be required depending upon the quantitative and qualitative selection of the other components, particularly the crosslinker, in the application of the polyblends in, for example, the automotive industry and also with respect to ski boots.

In another preferred aspect, the polyurethane is used in levels of from 48% to 70% in combination with from 28% to 50% of the polymer. The like combinations exhibit improved heat resistance while maintaining good flexibility. Such preferred blends can, for example, be utilised beneficially in cables, pipes, flexible films and tapes.

The essential polymer component is used in an amount from 10% to 70%, frequently from about 20% to 60% depending upon others the contemplated end-use of the polyblends. The monomers in the polymer are represented by: a vinylaromatic monomer; a polymerisable unsaturated dicarboxylic acid; and optionally, but preferably, another monomer, which latter monomer is different from the vinylaromatic and from the dicarboxylic acid monomers. The levels of these monomers are expressed by reference to the polymer (100%).

The vinylaromatic monomer represents from 10% to 95%, preferably from 40% to 92%. The vinylaromatic hydrocarbon monomer is preferably styrene although hydrocarbon derivatives of styrene such as lower-$C_1$-$C_6$-alkylstyrenes for example alpha-methyl styrene, and also vinyltoluene are useful.

The polymerisable unsaturated dicarboxylic acid usually represents from 1% to 50%, usually from 5% to 50%, preferably from 8% to 40%, and more preferably from 8% to 30%. The term "dicarboxylic acid" as used herein is meant to embrace acid species and/or anhydride species of said dicarboxylic acid. The most preferred dicarboxylic acid monomer is maleic acid although other species inclusive of chloromaleic acid, methylmaleic acid, sulfomaleic acid, phenyl- or benzylmaleic acid, fumaric acid, mesaconic acid, and aconitic acid and mixtures of such acid monomers inclusive of maleic acid can also he used. Part of the dicarboxylic acid can be imidized.

The other monomer, component b.3 of claim 1, can be represented by a polymerisable ester of an unsaturated carboxylic acid and also by acrylonitrile. The other monomer generally represents from 0% to 50%. In a preferred embodiment the other monomer is the polymerisable ester which can advantageously represent from 5% to 20% depending upon the proportions and the chemical nature of the other monomers in the polymer, the crosslinker and the desired end-use properties of the polyblend. In another preferred embodiment herein said polymerisable ester is beneficially present in a level from 25% to 45%, the selection criteria being as referred to in the preceding sentence. It is recognised, however, that the other monomer can be used, depending upon the selection criteria, at any level within the broad 0% to 50% range. The preferred polymerisable ester monomer is preferably methyl methacrylate although functionally related species inclusive of methyl acrylate, ethyl acrylate, ethyl methacrylate and butyl acrylate can be used. Mixtures of such ester monomers or mixtures of the ester monomer and acrylonitrile in e.g. a weight ratio of from 2:1 to 4:1 can also be used.

The siloxane cross-linker can be represented by the general formula :

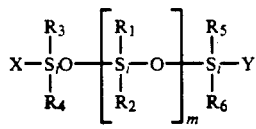

wherein, $R_1$, $R_2$, $R_3$, $R_4$, $R_5$ and $R_6$ independently represents a straight or branched, substituted alkyl group having from 1 to 8 carbon atoms or a carbocyclic group, having 5 or 6 carbon atoms, m is an integrer such that the molecular weight of the resulting siloxane is from 1,500 to 60,000 and X and Y individually represents a terminal group carrying a reactive moiety The backbone of the siloxane crosslinker is generally represented by a homopolymeric polydialkyl siloxane. The alkyl substituent can be represented by linear or branched species having from 1 to carbon atoms, or by a carbocyclic group having 5 or 6 carbon atoms. The alkyl group can be substituted, e.g. by hydroxy-groups. The most preferred alkyl substituent is the methyl group. It is, of course, also possible to use a combination of chemically different substituents, i.e. $R_1$–$R_6$ can be the same or differant moieties. The polydialkyl siloxane backbone can also be represented by a polymeric configuration wherein the

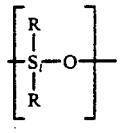

unit has been copolymerized with suitable non-silicon containing monomers such as ethylene glycol. In such block copolymer arrangements, the molar ratio of

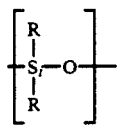

to non-silicon containing monomer shall be, at least 1, most preferably from 2 to 4.

The reactive moieties in the terminal groups X and Y can be independently selected from amine-, hydroxy- and epoxy-moieties. The bridging unit within the terminal groups X and Y serves to connect the reactive moiety to the siloxane backbone as defined hereinbefore. Examples of suitable bridging groups are alkyl-groups having e.g. from 2 to 6 carbon atoms and carbinol. Examples of preferred siloxane crosslinkers are:

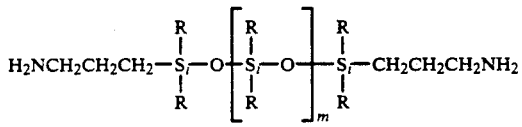

i.e. having identical aminopropyldimethyl terminal groups; and

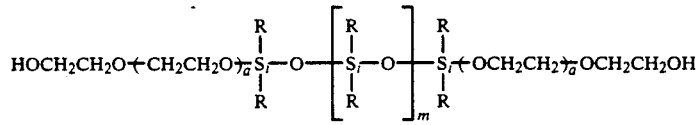

i.e. having identical carbinol terminal groups.

The preferred siloxane crosslinkers herein are represented by diaminoproxyl terminated polydimethylsiloxane and dihydroxy terminated polyethyleneoxide polydimethylsiloxane block copolymers wherein a is an integer from 1 to about 50.

The siloxane crosslinker has generally a molecular weight within the range of from 1,500 to 60,000, preferably from 2,000 to 30 000.

The siloxane crosslinker can be used in a level of from 1% to 25%, preferably from 2% to 20%, more preferably from 3% to 15%. The crosslinkers contain, at least two, reactive groups capable of providing the desired crosslinking. The reactive groups in the crosslinker can, for example, be independently selected from amine-, preferably primary amine-moieties, hydroxy- and epoxy-moieties. The reactive groups in the crosslinker can be identical or different. One preferred class of crosslinkers is represented by polyamines, most preferably diamines, which can form chemical bonds with the reactive carboxyl moieties on the polymer. Catalysts can be used to accelerate the reaction between crosslinkers and carboxylic acid groups. The proper choice of the catalyst should take into consideration the natures of the crosslinker and the polymer. For example, the sodium salt of para-toluene sulfonic acid can beneficially be used when reactive hydroxy groups are present in the siloxane crosslinker.

The inventive benefits can be provided by relatively low molecular levels of crosslinkers as compared to the correspondingly expressed levels of the polymerisable unsaturated carboxylic acid in the polymer.

Performance wise effective and beneficial crosslinking can result from molecular ratios of crosslinker to polymerisable, unsaturated dicarboxylic acid of as low as 0.01, and more preferably 0.04. Molecular ratios of crosslinker : polymerisable dicarboxylic acid in the range of from 0.10 to 0.25 were found to deliver, in some respects, preferred performances.

A preferred class of crosslinkers are diamines. Representative species of such compounds can be aminopropyldimethyl polydimethylsiloxanes having a molecular weight in the range from 22,000 to 28,000 containing two reactive, and preferably terminal, primary amine groups. It is understood, however, that crosslinkers containing, at least, one non-terminal reactive group can be used beneficially herein. Another preferred group of crosslinkers carry two terminal hydroxy groups. Representative species of such compounds are carbinol terminated polydimethylsiloxanes having a molecular weight in the range from 2,000 to 6,000 more preferably from 2,000 to 3,000.

The essential crosslinker component preferably has a molecular weight above about 500, more preferably above about 1,500 such as in the range of from 1,500 to 60,000. In a particular embodiment, the molecular weight of a preferred siloxane crosslinker is in the range of from about 2,000–30,000.

The polyblends herein further can contain as an optional component, from 0 to 50% preferably from 10% to 40% of a further polymeric component. This optional component can be represented, for example, by conventional acrylonitrile-butadiene-styrene copolymer (ABS) and methyl methacrylate-butadiene-styrene copolymer (MBS).

The components of the polyblend can be blended together by conventional techniques which are known to be suitable therefore. Such techniques can involve mechanical shear at an elevated temperature, for example in an extruder.

The polyblends can contain one or a series of conventional additives which are used for their art-established functionality in levels ranging possibly from 0 to 2 % or even more. Examples of the like additives and optionals include antioxidants, fillers, flame retardants, colourants, stabilisers, plasticizers, light stabilisers, processing aids etc.

The polyblends herein are especially useful for applications requiring superior physical and mechanical properties. In particular, non-fugitive polydimethylsiloxane based crosslinkers impart, at ambient temperature, desirable mechanical properties, such as impact strength, improved notched low-temperature impact, lower permanent tension and compression set. Furthermore siloxanes display very low surface energies and thus yield hydrophobic product properties and thermodynamic driving forces for its migration to the air interface. Therefore, these materials have desirable surface properties inclusive of low moisture absorption, wear resistance and di-electrical properties.

The invention is illustrated by the following examples.

EXAMPLES

In the following examples a number of polyblends were prepared and calendered into films and a series of physical properties as listed in Table II were measured.

TABLE I

| Polyester[1] Polyurethane | Polymer[2] | Crosslinker[3] Parts[a] | Parts[b] |
|---|---|---|---|
| A | 50 | 50 | | |
| I | 50 | 50 | 5 | |
| II | 50 | 50 | | 5 |

[1]: Methylene diphenyl di-isocyanate - based thermoplastic polyester polyurethane compound from The B. F. GOODRICH COMPANY.
[2]: The polymer is represented by a styrene-maleic anhydride methyl methacrylate copolymer (68% styrene; 25% maleic anhydride; 7% methylmethacrylate).
[3]: PDMS—NH2[a]: Diaminopropyl terminated polydimethylsiloxane (Hüls Chemical Co); molecular weight 24,000–28,000. PEO/PDMS/PEO—OH[b]: Dihydroxy terminated polyethylene oxide/polydimethylsiloxane block copolymer; molecular weight 2,300–2,500.

Composition A relates to a noncrosslinked polyblend whereas Examples I and II embody the technology in accordance with this invention.

Powdered mixtures (150 g) of the polyurethane/polymer blends of Table I (A, Ex. I and II) were molten on laboratory twin screw extruder. The crosslinker was then added to the melt. The crosslinker was pumped under pressure to the Molten polymer. The sample was calendered into a film 1 mm thick. The samples to be used for the measurements were made by injection molding and were tested as referred to hereinafter.

The physical measurements are reported hereinafter:

TABLE II

| | | A | I | II |
|---|---|---|---|---|
| Hardness (1) | Shore, D-2 | 62 | 60 | 57 |
| Tension Set 100% (2) | % | 75 | 72 | 53 |
| Tensile St, Brk (3) | MPa | 40.3 | 26.1 | 31 |
| Tensile Modulus (3) | MPa | 632 | 575 | 420 |
| Elongation (3) | % | 530 | 350 | 533 |
| Flex Str (4) | MPa | 22.8 | 23.1 | 17.2 |
| Flex Modulus (4) | MPa | 597 | 635 | 500 |
| Charpy,notched,RT | KJ/M2 | 132 | 105 | 122 |
| −20 C. | KJ/M2 | 6.6 | 15.8 | 13.6 |
| IDI,RT Emax/Efail | J | 14.5/30.3 | 12.6/26.8 | 14.5 |
| a −20 C. | J | 17.4/33 | 16.7/32.3 | 14.6/26.9 |
| Vicat, 1 Kg (5) | C | 118 | 111 | 105 |
| DTUL 66 psi | C | 82 | 65 | 77 |

(1) Hardness : ISO-868
(2) Tension set : ASTM D-412
(3) Tensile Strength; Tensile Modulus; Elongation at Fail : ISO R-527
(4) Flex Strength; Flexural Modulus : ISO-178
(5) Vicat 1 Kg : ISO-306

These data show and confirm that the inventive technology yields significant physical advantages which are complementary as compared to benefits derivable from optimised non-crosslinked polyblends while substantially maintaining desirable end-product properties of said non-crosslinked species.

I claim:
1. A polyblend comprising
   (a) from 20% to 89% by weight of a polyurethane;
   (b) from 10% to 70% by weight of a polymer comprising:

1. from 10% to 95% of a vinylaromatic monomer;
2. from 5% to 50% of a polymerisable unsaturated dicarboxylic acid; and
3. from 0% to 50% of a polymerisable ester of an unsaturated carboxylic acid;

(c) from 1% to 25% by weight of a siloxane crosslinker having the formula

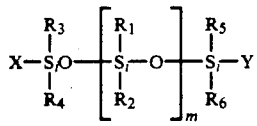

wherein, $R_1$, $R_2$, $R_3$, $R_4$, $R_5$ and $R_6$ independently represent a straight, branched, or substituted alkyl group having from 1 to 8 carbon atoms or a carbocyclic group, having 5 to 6 carbon atoms, m is an integer such that the molecular weight of the resulting siloxane is from 1,500 to 60,000 and X and Y individually represents a terminal group carrying a reactive moiety independently selected from the group consisting of amine, hydroxy or epoxy moieties.

(d) from 0% to 50% by weight of a further polymeric ingredient;

wherein the amounts of components (a), (b), (c) and (d) total 100%.

2. The polyblend in accordance with claim 1 wherein the polyurethane is used at a level of from 28% to 45% by weight, the polymer of component (b) is represented by a terpolymer containing from 5% to 20% of the polymerisable ester of an unsaturated carboxylic acid, said terpolymer being used at a level of from 53% to 70% by weight.

3. The polyblend in accordance with claim 1 wherein the polyurethane is used at a level of from 48% to 70% by weight, the polymer of component (b) is represented by a terpolymer containing from 25% to 45% of the polymerisable ester of an unsaturated carboxylic acid, said terpolymer being used at a level of from 28% to 50% by weight.

4. The polyblend in accordance with claim 2 wherein the crosslinker, contains at least two reactive moieties selected from amine-, hydroxy- or epoxy-moieties, said crosslinker having a molecular weight in the range from about 2,000 to 30,000.

5. The polyblend in accordance with claim 1 wherein the molecular ratio of the siloxane crosslinker to the polymerisable unsaturated dicarboxylic acid in the terpolymer is in the range of from 0.04 to 0.25.

6. The polyblend in accordance with claim 1 wherein the crosslinker, having two reactive terminal primary amine groups, has a molecular weight in the range of from 22,000 to 28,000.

7. The polyblend in accordance with claim 1 wherein the crosslinker having two reactive terminal hydroxy-groups has a molecular weight in the range of from about 2,000 to 6,000, preferably from 2,000 to 3,000.

8. The polyblend in accordance with claim 1 which in addition, contains from 10% to 40% by weight of the further polymeric ingredient which is represented by acrylonitrile-butadiene-styrene or methyl methacrylate-butadiene-styrene copolymers.

9. A process of producing an article by extrusion, injection-molding or blow-molding of the polyblend of claim 1.

* * * * *